United States Patent [19]
Dillhoff

[11] Patent Number: 5,310,346
[45] Date of Patent: * May 10, 1994

[54] EDUCATIONAL WORD GAME

[76] Inventor: Richard H. Dillhoff, 209 E. Anthony, Celina, Ohio 45822

[*] Notice: The portion of the term of this patent subsequent to Oct. 10, 2009 has been disclaimed.

[21] Appl. No.: 592,183

[22] Filed: Oct. 3, 1990

[51] Int. Cl.$^5$ .............................................. G09B 1/00
[52] U.S. Cl. ..................................... 434/167; 273/272; 273/243
[58] Field of Search ............... 434/128, 156, 157, 178, 434/167; 273/243, 249, 272, 273

[56] References Cited

U.S. PATENT DOCUMENTS

| | | | |
|---|---|---|---|
| 1,638,094 | 8/1927 | Gilmour | 273/249 |
| 1,694,068 | 12/1928 | Liebermann | 273/249 |
| 2,521,775 | 9/1950 | Brower | 273/272 X |
| 4,021,937 | 5/1977 | Kravitz | 434/167 |
| 4,029,320 | 6/1977 | Hausman | 273/249 |
| 4,306,725 | 12/1981 | Sawyer | 273/299 X |
| 4,889,344 | 12/1989 | Zimba | 434/167 X |
| 4,900,033 | 2/1990 | Campos et al. | 273/249 |

FOREIGN PATENT DOCUMENTS

| | | | |
|---|---|---|---|
| 521784 | 3/1921 | France | 434/157 |
| 551201 | 2/1943 | United Kingdom | 273/243 |
| 577617 | 5/1946 | United Kingdom | 273/249 |

OTHER PUBLICATIONS

Geyer's Sta., "A New Game That is Instructive as Well as Amusing", Oct. 1887 (Ad.).
Wordmaster, "Increasing vocabulary while having fun is not a trivial pursuit" (Ad.).

Primary Examiner—Richard J. Apley
Assistant Examiner—Karen Richard

[57] ABSTRACT

An educational word game apparatus utilizes game sheets or boards having rows of spaces for advancing a game piece a predetermined number of spaces. Many of the spaces contain words which are to be either read, pronounced, spelled, and/or defined before a player may move forward. The first player to reach a finish space wins the game. The game may be provided with words of varying difficulty, according to various professions, and in different languages.

5 Claims, 1 Drawing Sheet

| 14 | 18 | 17 | 22 | | | | | |
|---|---|---|---|---|---|---|---|---|
| START | FRIEND | CIRCLE | PERSON | PRONOUNCE THE NEXT FOUR WORDS TWICE, THEN | WRITER | BROTHER | FOUND | FIFTEEN ~30 ~28 |
| FAMILY | CAUSE (20) | GARDEN | SPEND | PRONOUNCE AND SPELL EACH WORD IN ORDER | GREAT | NUMBER | VOICE | WEEKEND ~32 |
| LAUGH | WANTED | PRONOUNCE THE NEXT THREE WORDS TWICE, THEN | CONTEST | THOUGHT | VISITOR | PRONOUNCE THE NEXT ~22 FOUR WORDS TWICE, THEN | HIDDEN | LONGER |
| HEAVY | BLIND | PRONOUNCE AND SPELL EACH WORD IN ORDER | AUTHOR | SCIENCE | PRETEND | PRONOUNCE AND SPELL EACH WORD IN ORDER | FLOWER | BIBLE |
| STORIES | GIANT | LEADER | FRONT | WORDS OF WISDOM ~24 | FEATHER | ANSWER | SUNDAY | TWENTY |
| MOTHER | PRONOUNCE THE NEXT FIVE WORDS TWICE, THEN | CERTAIN | SENTENCE | ENOUGH | RECIPE | QUICKLY | PRONOUNCE THE NEXT FIVE WORDS TWICE, THEN | FRIDAY |
| REALLY | PRONOUNCE AND SPELL EACH WORD IN ORDER | BORDER | NOTHING | THIRTY | WHISPER | THURSDAY | PRONOUNCE AND SPELL EACH WORD IN ORDER | DISCOVER |
| MINUTE | WEDNESDAY | BELIEVE | SATURDAY | WORDS OF WISDOM ~24 | COMPLETE | INTEREST | TUESDAY | GARAGE |
| BUSINESS | EXERCISE | EXCHANGE WITH THE LEADER ~24 | QUESTION | ENTERTAIN | MONDAY | EXCHANGE WITH THE LEADER ~24 | SCRIPTURE | MULTIPLY |
| DICTIONARY | IDENTIFY | DEFINITION | GLOSSARY | DIAGRAM | TREASURE | INFORMATION | LANGUAGE | FINISH ~26 |

~10

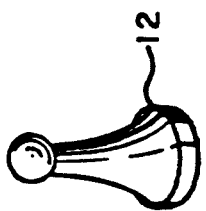

EDUCATIONAL WORD GAME

BACKGROUND AND SUMMARY OF THE INVENTION

This invention relates to games, and more particularly, to an educational word game involving reading, pronunciation, spelling, and/or definitions of selected words on a game board or sheet.

The subject invention will provide a game which is interesting to both children and adults, entertaining, and at the same time provides education for the players or participants without the usual formalities of an educational setting. The game can be played at home, school, church, or other setting (even while traveling) because the game has few parts and is easily transported.

In a preferred embodiment of the invention, the game is played on prepared game sheets or boards having seventy-four (74) words in spaces arranged on a sheet in rows. A booklet of twelve (12) different prepared game sheets may be provided offering a total of eight hundred eighty-eight (888) different words in a game set booklet. Players roll a die and take turns moving a game piece an equal number of spaces according to the number on the die. Whatever word happens to be on the space where the game piece comes to rest will be the word that the player must read, properly pronounce, spell, or define. Penalties are assessed if the player mispronounces, misspells, or cannot define the word on the space.

Game sheets or boards may be printed with words to fit a particular age group by providing words on the sheet which are of relative difficulty according to the expected intellectual advancement of the players. Special editions of the game may be provided which select words from various categories such as medical, legal, electronics, or any other particular profession or interest.

The foregoing and other advantages will become more apparent when viewed in light of the accompanying drawings and the following description wherein:

BRIEF DESCRIPTION OF THE DRAWINGS

FIG. 1 is a plan view of a game sheet of the present invention;

FIG. 2 is a perspective view of a game piece to be used in the present invention; and FIG. 3 is a perspective view of a die to be used with the present invention.

DETAILED DESCRIPTION OF A PREFERRED EMBODIMENT(S)

Referring now to the drawings, there is illustrated in FIG. 1 a substrate forming a game sheet generally indicated at 10 which shows a typical arrangement for the sheets or game boards of the present invention. A game piece 12, as shown in FIG. 2, may be provided for each player and would be placed on the start space 14 to begin the game. A die 16, as shown in FIG. 3, may be provided for each player to roll to determine the number of spaces 17 to move his game piece 12.

The words inside of the spaces 17 may be arranged to face two directions as in space 18 or one direction as in space 20. In other embodiments of the invention the words could be arranged to face four different directions (not shown) or any particular arrangement to make it easier for multiple players to see the words on the game board 10. Although the spaces are shown in FIG. 1 as rectangular in shape other shapes could be incorporated. Bonus spaces 22 may be provided to add variation to the game. Premium spaces 24 may also be included in the game to add excitement and luck in determining the outcome. The first player to advance his game piece 12 to the finish space 26 wins the game.

Although the preferred embodiment contains seventy-four (74) words per sheet 10 and twelve (12) sheets 10 in a game booklet (not shown) of sheets 10, the game sheets 10 could be arranged with more or less words and more or less sheets 10 per booklet. The game sheets 10 may be created in any language. An audio tape(s)(not shown) may be provided with the game that may contain proper pronunciation and definitions of the words on each space 17 along with the rules of the game.

The following set of rules are provided as a preferred manner of playing the game. However, variations of the rules and manner of playing the game are within the scope of this invention.

The game begins by each player rolling the die 16. In another embodiment of the game, the die 16 may be replaced by a number wheel or other means for determining the number of spaces 17 each player is to move. The player rolling the highest number on the die 16 begins the game. Beginning at the start space 14, the player moves his game piece 12 from left to right along row one 28 until coming to the last space 30 in row one 28. Each player moves his game piece 12 one space 17 per number shown on the die 16. After reaching the end of row one 28 the players game piece 12 is moved to the first space 20 in row two 32 and the game progresses in that fashion through all rows. The first player to land exactly on the finish space 26 wins the game. If there are not enough spaces 17 on the Playing sheet 10 near the end of the game to correspond with the number rolled on the die 16, the game piece 12 is moved backwards the number of spaces 17 on the die 16 for one turn and on subsequent turns moved forward again to attempt to land exactly on the finish space 26.

After each roll of the die 16 the player must properly pronounce (by quickly looking at the word on the space 17) and correctly spell (while looking away from the game sheet 10) the word on the occupied space 17. If incorrect, the player should pronounce and spell the word by reading it. The player loses a turn if a mistake is made while pronouncing, reading, or spelling a word the second time. Only one turn may be lost in this manner per occupied space 17. However, the player should make up to three attempts to correctly pronounce and read the misspelled word before advancing any further. The word should then be pronounced and spelled again by memory without looking at the game sheet 10. For young children just beginning to read and spell, the rules may be altered so that turns are not lost.

If a player lands on a space 17 already occupied by another player's game piece 12 (except in the first row 28), the first player immediately moves back five spaces and spells the new word (without looking at the game sheet 10) on his next turn. If the player is successful in doing this on his next turn, he will receive two bonus points but he will lose his next turn if the word is mispronounced or misspelled. After a player has accumulated a total of ten bonus points, the player may receive an extra turn. If while moving backwards the player finds that the space 17 is already occupied by another player's game piece 12, the other player in that space is now bumped backwards five spaces just as the previously bumped player. Any player who bumps other players three or more times can claim an extra free roll of the die 16 to be used on his next turn.

Bonus spaces 22 may lie in two or more rows on the game sheet 10. When landing on a bonus space 22, the player must enter the bonus space 22 in the upper row and exit the bonus space 22 in the lower row, continuing to move right. Special instructions may be contained within each bonus space 22. If the player does not correctly fulfill the directions contained in the bonus space 22, the player continues to move in the same row without the advantage of being able to drop down to a lower row. When a game piece 12 is on a bonus space 22, this is considered a safety zone and the player may not be bumped.

Premium spaces 24 may be provided on the game sheet 10 with special instructions to the player landing on a premium space 24. One example would be an "exchange with the leader" space which literally means that the player landing on that space would exchange places with the player having advanced his game piece 12 the furthest extent on the sheet 10. The player instigating the exchange must then properly pronounce and spell the word on the space 17 previously occupied by the leader. Other premium spaces 24 may be provided to give the player landing on a premium space 24 additional turns, safety zones, or even allowing the player to assign other players a difficult word on the game sheet 10 to pronounce and spell. If the words assigned to the other players are misspelled or mispronounced, the player making the error would be penalized by the loss of a turn.

When a player receives ten bonus points or has bumped other players three or more times, that player is entitled to an extra turn. However, the extra turn must be claimed and taken before the next roll of the die 16 or the player's free turn and accumulated bonus points are forfeited. Time limits may be placed on a player to keep the game moving at an interesting pace. When the players are young and just beginning to read and spell, the rules may be altered to allow for requests for assistance in pronunciation or spelling. If a young player requires assistance, in order to advance his game piece 12, he must repeat the pronunciation and the spelling after receiving assistance. A dictionary may be consulted to settle disputes over proper pronunciation, spelling, and definitions. A dictionary should only be consulted during the game if another player raises an objection. If a player raises an objection to another player's pronunciation, spelling, or definition of a word, and that objection turns out to be unjustified, the objecting player loses a turn.

While it will be apparent that the preferred embodiment of the invention disclosed is well calculated to provide the features above stated, it will also be appreciated that the invention is susceptible to modification, variation and change in the rules and construction of the game without departing from the proper scope or fair meaning of the subjoined claims.

What is claimed is:

1. A method for playing a game, said method comprising the steps of: placing a game piece on a start space of a substrate, said substrate having a plurality of rows thereon, wherein each row comprises a plurality of spaces, and a plurality of individual words are written in a plurality of said spaces; moving said game piece along said spaces according to the number appearing on a die which is to be rolled as each player takes a turn; and requiring a player to successfully perform at least one action from a group of actions consisting of reading, pronouncing, spelling, and defining said individual words in said spaces as said player's game piece is placed on particular ones of said spaces, for said player to be entitled to further advance said player's game piece on said substrate.

2. The game method of claim 1, wherein said words are in a foreign language.

3. The game method of claim 1, wherein said words pertain to a predetermined profession, trade, or other area of interest.

4. The game method of claim 1 further comprising the step of: including bonus spaces on said substrate that offer a player an opportunity to further advance his game piece if requirements of said bonus space are fulfilled.

5. The game method of claim 1, further comprising the step of: offering premium spaces that provide a player landing said game piece on one of said premium spaces with a form of good fortune to increase said player's chances of winning said game.

* * * * *